(12) United States Patent
Gruenewald

(10) Patent No.: US 11,047,669 B2
(45) Date of Patent: Jun. 29, 2021

(54) METHOD AND ARRANGEMENT FOR INCREASING A THROUGHPUT IN WORKPIECE MEASUREMENT

(71) Applicant: Carl Zeiss Industrielle Messtechnik GmbH, Oberkochen (DE)

(72) Inventor: Tom Gruenewald, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 315 days.

(21) Appl. No.: 16/292,283

(22) Filed: Mar. 4, 2019

(65) Prior Publication Data
US 2019/0271529 A1 Sep. 5, 2019

(30) Foreign Application Priority Data
Mar. 5, 2018 (EP) .................... 18160062

(51) Int. Cl.
| | | |
|---|---|---|
| *G01B 5/008* | (2006.01) | |
| *G01B 5/012* | (2006.01) | |
| *G01B 3/00* | (2006.01) | |
| *G01B 11/00* | (2006.01) | |
| *G01B 21/04* | (2006.01) | |
| *G05B 19/401* | (2006.01) | |

(52) U.S. Cl.
CPC .............. *G01B 5/012* (2013.01); *G01B 3/008* (2013.01); *G01B 11/005* (2013.01); *G01B 21/04* (2013.01); *G05B 19/401* (2013.01)

(58) Field of Classification Search
CPC ....................................................... G01B 5/008

USPC .......................................................... 33/503
See application file for complete search history.

(56) References Cited

U.S. PATENT DOCUMENTS 5,465,221 A * 11/1995 Merat .................. G06N 3/0427
702/83
8,600,523 B2 12/2013 Ruck
(Continued)

FOREIGN PATENT DOCUMENTS

| DE | 102013101931 A1 | 8/2014 |
|---|---|---|
| DE | 102014112396 A1 | 3/2016 |

(Continued)

*Primary Examiner* — George B Bennett
(74) *Attorney, Agent, or Firm* — Falk Ewers; Ewers IP Law PLLC

(57) ABSTRACT

A method and an arrangement for increasing the throughput in a workpiece measurement with a coordinate measuring machine (CMM) is provided. The CMM measures a workpiece, and the measurement is described by at least one measurement parameter, a value of which is variable. The method includes setting an initial value of the at least one measurement parameter, the initial value being a predetermined value of the at least one measurement parameter valid for measuring the workpiece, measuring the workpiece with the initial value, determining a value of at least one predetermined test characteristic based on results of the measuring of the workpiece, determining whether the at least one predetermined test characteristic satisfies a predetermined iteration criterion; and changing the initial value of the at least one measurement parameter and repeating the prior steps upon determining that the at least one test characteristic satisfies the predetermined iteration criterion.

10 Claims, 5 Drawing Sheets

(56) References Cited

U.S. PATENT DOCUMENTS

| | | | | |
|---|---|---|---|---|
| 2009/0024355 | A1* | 1/2009 | Negishi | G01B 5/008 702/168 |
| 2009/0300930 | A1* | 12/2009 | Ishikawa | G01B 5/28 33/559 |
| 2014/0025336 | A1* | 1/2014 | Noda | G01B 21/20 702/168 |
| 2014/0059872 | A1* | 3/2014 | Nakagawa | G01B 21/045 33/502 |
| 2014/0130362 | A1* | 5/2014 | Ishikawa | G01B 5/008 33/503 |
| 2014/0157610 | A1* | 6/2014 | Garvey | G05B 19/401 33/503 |
| 2015/0204653 | A1* | 7/2015 | Przygodda | G01B 21/045 33/503 |
| 2015/0330762 | A1* | 11/2015 | Gong | G01B 7/012 33/503 |
| 2017/0138726 | A1* | 5/2017 | Roithmeier | G05B 23/0272 |
| 2017/0160066 | A1 | 6/2017 | Grupp et al. | |
| 2018/0045511 | A1 | 2/2018 | Georgi et al. | |
| 2019/0111534 | A1* | 4/2019 | Ishii | G05B 19/401 |
| 2020/0072591 | A1* | 3/2020 | Hagino | G01B 21/04 |
| 2020/0355495 | A1* | 11/2020 | Mueller | G01B 21/02 |

FOREIGN PATENT DOCUMENTS

| | | |
|---|---|---|
| DE | 102015114715 A1 | 3/2017 |
| EP | 2115538 B1 | 3/2011 |
| EP | 2281666 B1 | 1/2018 |
| WO | 2016169589 A1 | 10/2016 |

\* cited by examiner

METHOD AND ARRANGEMENT FOR INCREASING A THROUGHPUT IN WORKPIECE MEASUREMENT

CROSS REFERENCE TO RELATED APPLICATIONS

This application claims priority to European patent application EP 18 160 062.8, filed Mar. 5, 2018, the entire content of which is incorporated herein by reference.

TECHNICAL FIELD

The invention relates to a method and an arrangement for increasing the throughput in workpiece measurement. In particular, the invention relates to the choice of at least one measurement parameter of a coordinate measuring machine (CMM) to permit a high throughput with a sufficient measuring accuracy. Suitable values of the measurement parameter may be identified substantially or completely automatically in the course of test measurements and used for the future measuring of workpieces of the same type of construction.

BACKGROUND

The measuring of workpieces by CMMs is known. CMMs generally serve the purpose of capturing the surface of workpieces in a tactile or contactless manner and, on this basis, determining spatial positions (i.e., coordinates) of the captured measuring points on the surface. Typically, this involves moving a sensor unit for recording measuring signals by the CMM relative to the workpiece to be measured. The sensor unit may be realized for example in the form of a tactile measuring probe or a contactlessly detecting optical sensor.

Depending on the workpiece to be measured and the specific measuring task, various operating parameters of the CMM can be specifically set. The workpiece measurement is then carried out in accordance with the operating parameters. For this reason, the operating parameters are also referred to hereinafter as measurement parameters. Examples of measurement parameters are a measuring speed, a measuring force or a search path.

A general conflict of objectives when measuring workpieces is that the measurement results should be as accurate as possible. For this purpose, a comparatively long measuring time is generally required. On the other hand, in particular in industrial workpiece production, and especially in serial workpiece production, the CMM should enable the highest possible throughput of workpieces. However, this requires that the measuring time is kept as short as possible.

The throughput in this case concerns the number of workpieces that can be measured within a predetermined period of time or time unit (for example, the measurable number of workpieces per hour). Serial workpiece production, and accompanying serial measurement, may be understood as meaning cyclic, multi-repetitive, and/or merging into one another production or measurement.

In order to choose suitable values for the measurement parameters of a CMM that permits a sufficient accuracy along with a high throughput, a user previously had to rely on empirical values, guidelines or possibly even standards. Software solutions also exist in the form of expert systems, which for example, with knowledge of the workpiece to be measured and the CMM being used, can give recommendations regarding suitable measurement parameter values.

However, it has not yet been possible to resolve the above conflict of objectives satisfactorily with these approaches, in particular since a sufficient measuring accuracy cannot always be ensured when the throughput is increased.

SUMMARY

It is therefore an object of the present disclosure to increase the throughput of workpieces in workpiece measurement with a sufficient measuring accuracy.

This object is solved by a method and an arrangement as disclosed herein. It goes without saying that, unless otherwise specified or evident, the features mentioned in the introductory description may also be provided individually or in any desired combination in the solution that is presently disclosed.

The inventor has recognized generally that there is a need for determining suitable measurement parameters to solve the described conflict of objectives. This should take place as far as possible in an automated way (i.e., without extensive user inputs, or even substantially without any user inputs). Provided in particular is an iterative changing of measurement parameters, which can be carried out at least until a predetermined criterion is no longer satisfied. The iteration is in this case typically selected so as to achieve a measurement parameter value that allows a throughput that is as high as possible. By monitoring the criterion, however, it can be ensured that a sufficient measuring accuracy is still achievable with this measurement parameter value.

In detail, a method for increasing the throughput in workpiece measurement with a CMM is provided, wherein the CMM is configured to measure a workpiece, wherein the measurement can be described by at least one measurement parameter, the value of which is variable, and wherein the method includes:

a) setting an initial value of the at least one measurement parameter;

b) measuring a workpiece, a set value of the at least one measurement parameter being valid;

c) determining a value of at least one predetermined test characteristic on the basis of results of the measurement;

d) checking whether the at least one test characteristic satisfies a predetermined iteration criterion, and if this is the case:

e) changing and consequently setting the value of the measurement parameter or changing and consequently setting the value of at least one of the measurement parameters and repeating measures b) to d).

The CMM may be formed according to any common type of construction and may be designed generally for tactile and/or contactless workpiece measurement. The workpiece may be an industrially produced workpiece.

The method may generally serve the purpose of determining suitable measurement parameter values for workpieces of a specific type of construction or of a specific kind. For this purpose, the method may first be applied to a workpiece of which the properties are known and/or which has been produced with a sufficient and desired accuracy. For example, this workpiece may be within all of the prescribed tolerances for the test characteristics to be measured. The measurement parameter values that have been determined on the basis of this typical and/or particularly accurate workpiece can subsequently be used for measuring further comparable workpieces. The first-measured, and particularly accurate workpiece can also be described as a test body, test workpiece or master part.

One advantage of this aspect of the disclosure is that any measuring inaccuracies on the basis of the preferred properties of the workpiece can be substantially or exclusively attributed to the measurement parameter values. In other words, it can be deduced with a high degree of probability that the choice of certain measurement parameter values is unsuitable if the measurement results have or indicate an insufficient accuracy (for example indicate a failure to keep within tolerances even though the workpiece was produced with appropriate accuracy).

The method can generally be implemented in an automated manner. All of the measures can consequently be performed or initiated by a control device and/or a processor unit of the CMM. The control device may generally be electronically and/or digitally operable. Separate user inputs or operating actions may not be required, but according to the disclosure may similarly take place or be made possible, for example in the course of measures a) and e).

The automated performance of the measures may for example include automated determination and checking according to measures c) and d), for which calculations and/or evaluations can be performed on the basis of stored program instructions. The setting and/or changing of measurement parameter values according to measure e) may take place in accordance with decision rules, which in turn may be stored in the form of program instructions. Alternatively, a (digital) table of values may be provided therefor, from which new or changed values can be read out.

In the course of measure b), a generally automated measuring mode of the CMM may be performed, as it is already used in existing solutions. When it is performed for the first time, the initial value is taken as a basis here. When it is performed later, the value changed in the course of measure e) is taken as a basis.

Unless otherwise stated or evident, the listing of method measures a) to e) should not be understood as a definition of a compulsory time sequence. At least measures b) and c) may, for example, be performed at least partially in parallel or overlapping in time.

The measurement parameter may in particular be one of the following:

A measuring speed: This may be understood for example to mean the relative speed between a workpiece and a sensory unit (for example a measuring probe) of the CMM. A contactless measuring speed, by moving an optical sensor unit and/or any optical recording field thereof relative to a workpiece, may also be considered. The measuring speed may also be referred to as the (tactile or contactless) scanning speed. Generally, high measuring speeds make a high throughput possible, but may also result in a higher risk of inaccuracies.

A standstill time (for example resulting from stopping at synchronization points): A standstill time may occur in a known way whenever stops are deliberately made at so-called synchronization points when traveling over a certain sequence of measuring points along a workpiece surface, in order to read out a current position of the CMM and/or of its sensor unit. Generally, short standstill times make a high throughput possible, but may also result in a higher risk of inaccuracies.

A probing speed: The probing speed concerns the speed at which a sensory unit, and in particular a measuring probe, approaches a predetermined measuring point or scanning point. Generally, high probing speeds make a high throughput possible, but may also result in a higher risk of inaccuracies.

A measuring force: The measuring force concerns the force with which a sensory unit of the CMM, and in particular a measuring probe, is applied to the workpiece to be measured, or, in other words, is supported on the workpiece. Depending on the material of the workpiece to be measured, low measuring forces may be typical, for example, in order to avoid damage to a comparatively soft workpiece surface (or snagging of a measuring probe therein), and generally to increase the measuring accuracy. However, low measuring forces may restrict the measuring speed that can be applied, since, for example, there is the risk of a measuring probe lifting off from the workpiece surface. Consequently, depending on the current measuring task, the measuring force may have an effect especially on the accuracy but also at least indirectly on the applicable measuring speed, and consequently the achievable throughput.

An acceleration: Accelerations in the course of the probing or measuring operation are relevant in particular in the form of initial accelerations, with which the relative movement performed for the measuring process (or else scanning movement) between the sensory unit and the workpiece is initiated. Generally, high accelerations make a high throughput possible, but as a result, may also result in a higher risk of inaccuracies, in particular at the beginning of a measuring operation.

In principle, the disclosure may also be used for or with other measurement parameters. In particular, the measurement parameters may concern any operating parameters of a CMM that can be selected and/or can be changed for the measuring of a workpiece. In addition or alternatively, all of the operating parameters of a CMM may be considered as measurement parameters which can in principle have an effect on the measuring accuracy.

A test characteristic feature is understood according to conventional definitions to mean a feature to be checked or to be measured, and in particular a geometrical feature (or a geometrical property) of the workpiece. Examples of a test characteristic are the roundness of a workpiece region, the parallelism between two workpiece areas, the planarity or roughness of the workpiece surface or the shape deviation of a workpiece region (for example from a prescribed shape such as a circle). In step c), the value of a corresponding test characteristic can consequently be derived or determined on the basis of the determined coordinates, which may form the measurement result.

On the other hand, a test element concerns that region or that geometrical element of the workpiece that is to be checked with regard to its properties, and in particular with regard to at least one test characteristic. Examples of a test element are a diameter step, an edge, or the like.

The iteration criterion may be understood to mean a criterion that has to be satisfied in order to carry out a further iteration (or a further iteration cycle), or a further measurement cycle. An iteration or a measurement cycle may in this case include measures e) and also b) to d), at the beginning a new measurement parameter value first being set according to measure e). If the iteration criterion is not satisfied, which generally can similarly be established in the course of measure d), it may involve not to perform measure e) again and/or only to perform it under the further preconditions described below.

As likewise described below, the iteration criterion may in particular concern the obtainment or non-obtainment of acceptable or admissible values of a test characteristic. Admissible values of the test characteristic may be stored in advance (i.e., before implementing the method or else in the course of measure a)). This may be performed by a user or take place automatically by calculating or reading out suitable values from a database.

The changing of the value of the measurement parameter may generally concern increasing or reducing this value. Certain embodiments of the method and the arrangement provide that only one of the aspects is always implemented, that is to say that in every iteration, the value is once again increased or once again reduced with respect to the respectively previous value. Similarly, it is also possible to implement both aspects (that is to say both increasing and reducing), which may, for example, take place in the course of different iteration cycles.

One exemplary embodiment of the method and the arrangement consequently provides that, whenever the iteration criterion is satisfied, the value of the measurement parameter is increased in the course of measure e).

As described, this may concern a continual increase in all of the iteration cycles or else just a sporadic increase only in individual iteration cycles. In particular, however, it may be provided that the iteration cycles, or in other words the number of measures e) in which the value of the measurement parameter is increased, exceeds, and typically significantly exceeds, the number of possible reductions of the measurement parameter value (for example, by a factor of at least 5 at least 10). For example, the increase may be defined as the standard procedure in the course of measure e) and any reduction may only take place in predetermined exceptional situations.

The increase of the measurement parameter value, or generally the change in the course of measure e), may involve changing the value by the same amount in every iteration (for example increasing or reducing it each time by 10% with respect to the previous value). This makes it possible for the possible range of values of the measurement parameter to be uniformly covered and recorded. Alternatively, it is also possible to change the value of the measurement parameter in different ways in the course of measure e). For example, the extent of the change may be adapted depending on whether the iteration criterion has been satisfied with a great margin or only barely. In the latter case, this may mean that that the measurement parameter has already reached a critical value, and therefore should only be changed slightly for the next iteration cycle. If, on the other hand, there is a large margin, a correspondingly larger change may be made.

Increasing the measurement parameter value in the course of measure e) may take place in particular whenever the iteration criterion concerns an obtainment of admissible values of the test characteristic (i.e., it is satisfied when there are admissible values). Admissible or acceptable values of the test characteristic may be understood to mean values of the test characteristic or else a range of values of the test characteristic that has/have been defined in advance as admissible or acceptable. This may be performed by a user or take place by automatically reading out information stored in advance (i.e., before implementing the method). In this regard, the iteration criterion may for example be defined as an admissible or acceptable shape deviation of less than a specific value (for example less than 2.5 µm). If the corresponding test characteristic exceeds this value, the iteration criterion may be regarded as not satisfied.

The aspect according to which the measurement parameter value is increased and the iteration criterion concerns the obtainment of admissible values may be relevant for example for measurement parameters in the case of which highest possible values optimize the throughput, but at the same time also increase the risk of inaccuracies (for example the measuring speed). The measurement parameter value should therefore continue to be increased at least as long as there is still a sufficient accuracy.

According to an aspect of the disclosure, it may also be provided that the value of the measurement parameter is increased in the course of measure e) whenever the iteration criterion is satisfied, the iteration criterion being satisfied if an inadmissible value of the test characteristic is determined. This may be relevant for example for measurement parameters in the case of which smallest possible values optimize the throughput, but at the same time also increase the risk of inaccuracies (for example the standstill time). Starting for example from a lower limit value, which produces a high throughput but not a sufficient measuring accuracy, the measurement parameter can then continue to be increased at least until admissible values of the test characteristic are obtained.

In addition, in the context of the present disclosure it may be provided to set the initial value of the measurement parameter so that it corresponds to a lower or upper limit value of the measurement parameter. The lower and upper limit values may be prescribed by a user or automatically determined from information stored in advance. The lower and upper limit values may be prescribed in view of a specific measuring task or be prescribed on the basis of properties of the CMM. For example, on the basis of the power range of the driven axes of a CMM, the measuring speed may be upwardly and downwardly restricted by a corresponding limit value.

If in the course of measure e) the value of the measurement parameter is always increased, is increased by default, or is generally increased predominantly, it may be provided that the initial value is selected in the course of measure a) as a lower limit value of the measurement parameter. In the case of this aspect, the measurement parameter may in particular be successively increased, the iteration criterion typically only being satisfied when admissible values of the test characteristic are reached. For example, measurement parameters such as a measurement speed or acceleration can be taken into consideration, which when increased also increase the risk of inaccuracies. Such measurement parameters can consequently be successively increased from their lower limit value as long as the iteration criterion is satisfied.

According to another aspect of the method and of the arrangement, it is provided that, whenever the iteration criterion is satisfied, the value of the measurement parameter is reduced in the course of measure e). It may once again be provided that this is always performed in the course of measure e), or at least is predominantly performed when considered over an entire enactment of the method (i.e., the value is reduced much more often than it is increased, for example is reduced more often by a factor of at least 5 or 10). Furthermore, the reduction may be defined as the standard procedure in the course of measure e) and any increase may only take place in predetermined exceptional situations. In the course of measure a), it may therefore be provided to select an upper limit value of the measurement parameter as the initial value, which is then successively reduced.

Furthermore, it may be provided in this context that the iteration criterion is an acquisition of inadmissible values of the test characteristic (i.e., it is satisfied when there are inadmissible values). The measurement parameter can therefore continue to be reduced until admissible values of the test characteristic are obtained for the first time. This may once again be relevant for measurement parameters that assume highest possible values for a high throughput such as the measuring speed.

According to an aspect of the disclosure, it may also be provided that the value of the measurement parameter is reduced in the course of measure e) whenever the iteration criterion is satisfied, wherein the iteration criterion is satisfied if an admissible value of the test characteristic is determined. This may once again be relevant for measurement parameters in the case of which smallest possible values optimize the throughput, but at the same time also increase the risk of inaccuracies (for example the standstill time). Starting for example from an upper limit value, which produces a low throughput but a sufficient measuring accuracy, the measurement parameter can then continue to be reduced and the throughput increased at least as long as admissible values of the test characteristic are obtained.

For the decision whether the measurement parameter value is to be increased or reduced, and in particular is to be increased from a lower limit value or reduced from an upper limit value, it may be taken into consideration which of these measures is likely to lead to success with a smaller number of iteration cycles. If, for example, it can be assumed that a measuring speed would have to be increased to a considerable extent before inadmissible values of the test characteristic are reached, to reduce the number of iterations, a reduction from the upper limit value of the measuring speed may instead be typical.

According to an aspect of the disclosure, it may therefore also be provided that, in the course of a separate measure, it is determined which of the aspects described should be selected and how then the iteration criterion should be defined (that is to say whether it should be that an increase is performed and the obtainment of admissible values considered, or a reduction and obtainment of inadmissible values).

In principle, it may be provided that, whenever in the course of measure d) a failure to satisfy the iteration criterion is established, that measurement parameter value with which the iteration criterion was last satisfied is identified for being used for future workpiece measurements. In other words, the value that last led to a desired result can be identified as the preferred measurement parameter value.

This relates in particular to the aspect in which the iteration criterion concerns an acquisition of admissible values of the test characteristic, since the corresponding measurement parameter value would then also lead to admissible test characteristic values in the future.

If the iteration criterion concerns an acquisition of inadmissible values, the value that last satisfied the iteration criterion may likewise be acceptable, if an inaccuracy that accompanies it is tolerated. It is however provided in this case that, whenever in the course of measure d) a failure to satisfy the iteration criterion is established, the measurement parameter value with which the iteration criterion was not satisfied last (or else for the first time) is identified for being used for future workpiece measurements. This would mean once again that a measurement parameter value with which admissible values of the test characteristic have been obtained is selected.

Alternatively, it may be provided that, whenever in the course of measure d) a failure to satisfy the iteration criterion is determined, the value of the measurement parameter is again changed at least once, and at the same time typically a measurement parameter value that lies between the measurement parameter value not satisfying the iteration criterion and the measurement parameter value with which the iteration criterion was last satisfied is selected. In other words, an intermediate value that lies between the two previous measurement parameter values may be formed for the measurement parameter. The failure to satisfy the iteration criterion may represent a previously mentioned predetermined exceptional situation, in which there is a departure from a standard increase or reduction of the measurement parameter value, in particular in order to form the described intermediate value.

For renewed changing of the measurement parameter value, measure e) may once again be performed at least once. Generally, at least measures b) and c), but optionally also d), may be performed one more times on the basis of the once again changed measurement parameter value.

Generally, the procedure described above makes it possible that, in the course of further changes of the measurement parameter, an optimum measurement parameter value (i.e., one which increases the throughput to the maximum) can be approached still further. Instead of choosing that value with which the iteration criterion was satisfied for the first time or even not satisfied, this specifically allows an even finer iteration to take place, in order for a measurement parameter value with as high a throughput as possible to be approached still more exactly.

If the iteration criterion concerns an acquisition of admissible values of the test characteristic, it can consequently be provided in the case of this aspect that, whenever a measurement parameter value leads to an inadmissible test characteristic value for the first time, this measurement parameter value is reduced one more time. In particular, such a reduction may be provided so that the measurement parameter value lies between a measurement parameter value last satisfying the iteration criterion and the measurement parameter value not satisfying the iteration criterion for the first time. Consequently, instead of immediately ending the method and identifying a suitable measurement parameter with which the iteration criterion was last satisfied, it is possible in the course of a renewed iteration to undertake a further attempt to determine a measurement parameter value that leads to admissible values, but potentially makes a higher throughput possible. To be more precise, since this further measurement parameter value lies between the previous values, there is the possibility of identifying an admissible measurement parameter value that further increases the throughput.

The new intermediate value of the measurement parameter may be selected as a mean value between the prescribed previous measurement parameter values. If the iteration criterion is satisfied with this measurement parameter value, it can be identified directly as a value that is to be used for future workpiece measurements. Alternatively, yet further changing of the measurement parameter values may also be provided, but typically not beyond that measurement parameter value with which the iteration criterion was not satisfied. In particular, the measurement parameter value may be further changed from the intermediate value (and may be in particular changed in a way that increases the throughput) as often as it takes until the iteration criterion is no longer satisfied.

If, however, the iteration criterion is not satisfied with the intermediate value of the measurement parameter, it can be changed one more time in such a way that it lies closer to the measurement parameter value with which the iteration criterion was last satisfied. This may take place as often as it takes until the iteration criterion is satisfied again for the first time. The value with which this succeeds can then be identified as the measurement parameter value that is to be used for future workpiece measurements.

Over and above this, in the case of the aspects described above, it can consequently be provided that the method is implemented at least as long as it takes (and/or that the measurement parameter value is changed at least as long as it takes) until there is at least once a failure to satisfy the iteration criterion and the iteration criterion is subsequently satisfied once again (i.e., is satisfied again). It may also be provided that a minimum number of cycles (for example two or three) in which the iteration criterion is first not satisfied and then satisfied again is to be reached.

As described, a predetermined lower or upper limit value of the measurement parameter value may be selected as the initial value for the measurement parameter value. Alternatively, a value between a predetermined lower limit value for the measurement parameter and a predetermined upper limit value for the measurement parameter may be selected as the initial value. In particular, the initial value may be selected as a mean value between such limit values. If the possible range of values of the measurement parameter between the lower limit value and the upper limit value is considered as a range of values of 100%, it may also be provided that the initial value is selected as a value that lies no closer to one of the limit values than 25% or no closer than 40%. The mean value would in this case lie at 50%. In other words, the initial value may consequently also be selected off-center and not as a mean value.

By choosing the initial value as a value between the limit values, the number of possible iteration cycles can generally be reduced if beginning from the upper limit value or lower limit value would be likely to cause a large number of iterations. Furthermore, this provides the possibility of quickly establishing whether reducing or increasing the measurement parameter value in the course of future iterations represents the most promising approach. If, for example, it is established on the basis of the initial value that inadmissible values of the test characteristic would immediately be obtained, changing the measurement parameter values may be performed in such a way that higher accuracies are achievable. The iteration criterion may then be defined as an acquisition of inadmissible values of the test characteristic (i.e., changing of the value should take place at least as long as it takes until admissible values are obtained). In the case of the measuring speed, this would consequently be reduced until admissible values are obtained.

On the other hand, when obtaining admissible values of the test characteristic on the basis of the initial value, it may be possible to change the measurement parameter to achieve a higher throughput and to define the iteration criterion as an acquisition of admissible values (i.e., changing of the value should take place as long as it takes until inadmissible values are obtained). In the case of the measuring speed as the measurement parameter, it may consequently be increased as long as it takes until inadmissible test characteristic values are obtained.

The disclosure may therefore also provide a separate measure, according to which it is determine on the basis of the initial value (or the measurement results derived from it) which changes in the course of measure e) and/or which iteration criterion is/are to be used (in particular in the form of an obtainment of admissible or inadmissible values). Such a function is advantageous for automating the method as much as possible or else completely.

The method and the arrangement may therefore provide that, on the basis of a measuring accuracy achievable with the initial value, it is determined in what way the initial value is to be changed in the course of measure e) and/or how the iteration criterion is defined.

In the case of an initial value between the upper limit value and the lower limit value of the measurement parameter, it may also be possible to choose after or before a measurement process the upper limit value and/or the lower limit value as the measurement parameter value on the basis of the initial value. It can thus be ensured that these limit values are likewise taken into account. This may be advantageous for example whenever with these values the iteration criterion is directly satisfied and/or for these values a high throughput is obtained along with a sufficient accuracy. Consequently, the method may under some circumstances be ended more quickly than if one were to begin from the initial value with a large number of smaller iteration steps. Furthermore, it can in this way be ensured that the corresponding limit values are in any event reached and checked, which would not be possible under some circumstances in the case of iteration purely on the basis of the initial value.

In the case of a development of the method and the arrangement, a measurement parameter value for being used for future workpiece measurements is set when at least one of the following preconditions is satisfied:

A prescribed highest number of changes of the measurement parameter value (or, in other words, of iteration cycles or iteration operations) has been reached. In other words, it may be provided that the number of possible performances of measure e) is limited by a corresponding highest number.

An admissible limit value of the measurement parameter value has been reached or exceeded. Such a limit value may be defined in particular in the form of the already described lower and/or upper limit value of the measurement parameter value. By this aspect, it can therefore be ensured that the limits prescribed by the user or dictated by the configuration of the CMM are reliably maintained.

A measurement parameter value with which the iteration criterion is satisfied again after a prior failure to satisfy it has been selected. This concerns in particular the aspect described above, wherein, after a failure to satisfy the iteration criterion, first an intermediate value of the measurement parameter that lies between the two measurement parameter values last considered is formed. The measurement parameter value to be used for future measurements may be set as that value with which the iteration criterion is satisfied again for the first time (for example if the iteration criterion concerns an obtainment of admissible test characteristic values). If the iteration criterion concerns a determination of inadmissible test characteristic values, the measurement parameter value to be used for future measurements may be selected as that value with which the iteration criterion was not satisfied last before it was satisfied once again (i.e., the last measurement parameter value that led to admissible test characteristic values is selected).

An admissible overall time period has been reached. The overall time period may concern the time period that was previously required for implementing the method and in particular all of the iteration cycles.

Any of the preconditions mentioned may represent a criterion to abort, which if satisfied (the precondition or the criterion) leads to the method being ended, even though for example a current iteration cycle has not yet been completed.

In this connection, the method and the arrangement may also provide that a measuring process is carried out on at least one other workpiece by applying the measurement parameter value set in the way described above. In particular, the workpiece may be a workpiece of the same type of construction, for example from industrial series production. The set measurement parameter value may therefore be used for the purpose of measuring further workpieces after a determination according to one of the aforementioned aspects in the course of a preferably serial or cyclical measurement.

The disclosure also relates to an arrangement for increasing the throughput in workpiece measurement, including:

a CMM configured to measure a workpiece by applying at least one variable measurement parameter; and a control device configured to instigate or perform the following measures:

a) setting an initial value for at least one measurement parameter;

b) measuring a workpiece by applying the measurement parameter;

c) determining a value of at least one predetermined test characteristic based on the measurement;

d) checking whether the test characteristic satisfies a predetermined iteration criterion, and if this is the case:

e) changing the value of the measurement parameter and repeating measures b) to d).

The control device may therefore include at least one of the following devices and/or may be combined with the device:

a setting device configured to set the initial value for at least one measurement parameter;

a measuring device configured to measure the workpiece by applying the measurement parameter;

a determining device configured to determine the value of the at least one predetermined test characteristic based on the measurement;

a checking device configured to check whether the test characteristic satisfies a predetermined iteration criterion; and a changing device configured to change the value of the measurement parameter.

The control device is also configured to control the sequence of the measures.

The arrangement may include any development and any further feature in order to provide or perform all of the steps, operating states and functions mentioned above or below. In particular, the arrangement may be designed to implement a method according to any of the aspects mentioned above or below.

BRIEF DESCRIPTION OF THE DRAWINGS

The disclosure will now be described with reference to the drawings wherein.

DESCRIPTION OF EXEMPLARY EMBODIMENTS

Exemplary embodiments of the disclosure are described below based on the accompanying schematic figures. Features that coincide in their nature and/or function are provided with the same designations throughout the exemplary embodiments.

Figure 1:
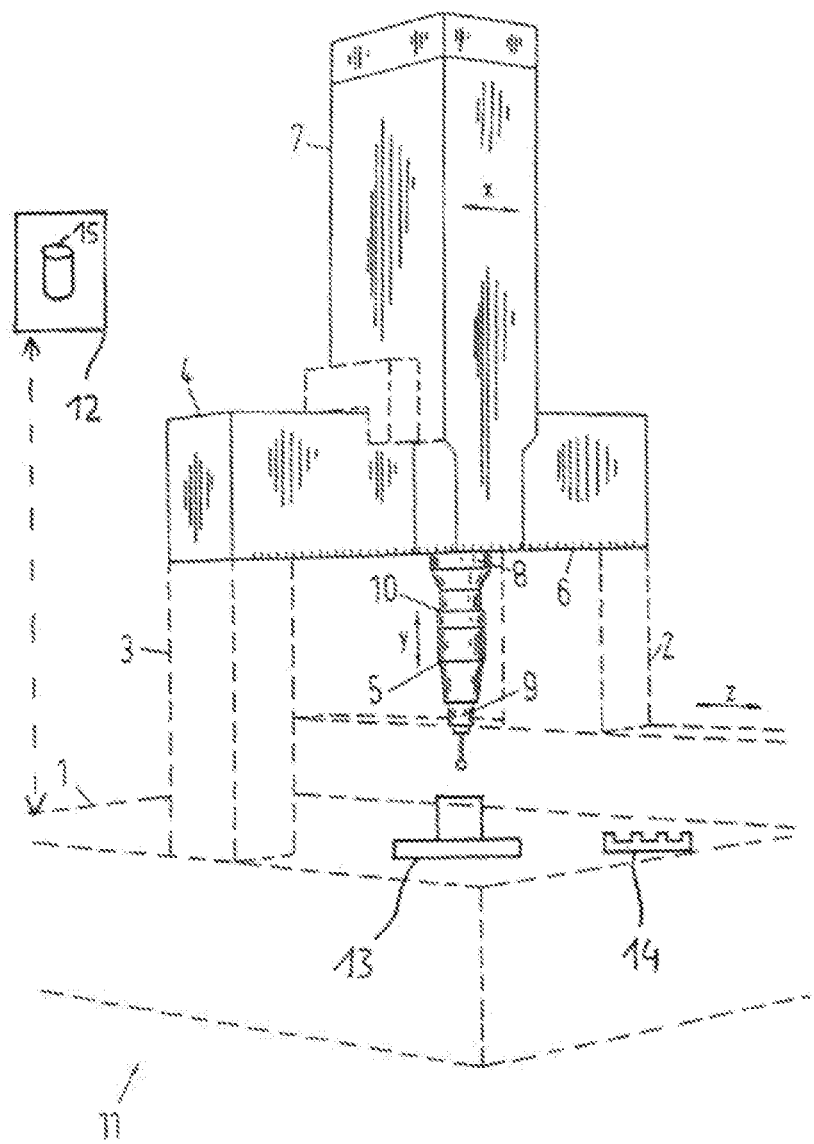
FIG. 1 shows a view of an arrangement with which methods can be implemented according to an exemplary embodiment of the disclosure.

The arrangement 11 shown in FIG. 1 includes a CMM of a gantry type of construction, which has a measuring table 1, over which columns 2, 3, which together with a crossbeam 4 form a gantry of the CMM 11, can be moved. The crossbeam 4 is connected at its opposite ends to the columns 2 and 3, respectively, which are mounted longitudinally displaceably on the measuring table 1.

The crossbeam 4 is combined with a cross slide 7, which is movable, by air bearings, along the crossbeam 4 (in the X direction). The current position of the cross slide 7 relative to the crossbeam 4 can be determined on the basis of a scale graduation 6. A quill 8, which is movable in the vertical direction, is mounted on the cross slide 7 and connected at its lower end to a sensor device 5 by a mounting device 10. Removably arranged on the sensor device 5 is a probe head 9, which scans in a tactile manner. Instead of the probe head 9, the sensor device 5 could similarly include a contactlessly scanning sensor, in particular a laser sensor.

Arranged on the measuring table 1 is an additional rotatable measuring table 13, on which a measurement object can be arranged, which can be turned about a vertical axis of rotation by a rotation of the measuring table 13. Also arranged on the measuring table 1 is a magazine 14, in which various probe heads that can be exchanged for the probe head 9 may be arranged, or in which various styluses that can be exchanged for the stylus carried on the probe head 9 may be arranged.

FIG. 1 also schematically shows a controller 12 of the CMM, which may be realized, for example, by a computer on which software instructions are executed and which includes at least one data memory 15. The computer is connected by signal and control lines to actuatable components of the CMM, in particular to drives. Furthermore, the controller 12 is connected by a measurement data connection to those elements of the CMM that are used for determining the coordinate measured values. Since such elements and devices are generally known in the field of CMMs they are not discussed in detail here.

Figure 2A:
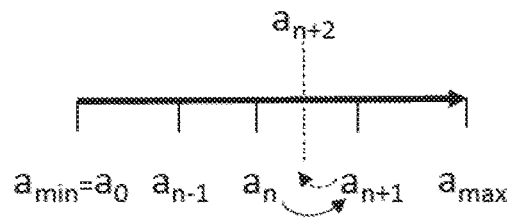
FIG. 2A shows representations of possible measurement parameter changes according to a first exemplary embodiment of the disclosure.
Figure 2B:
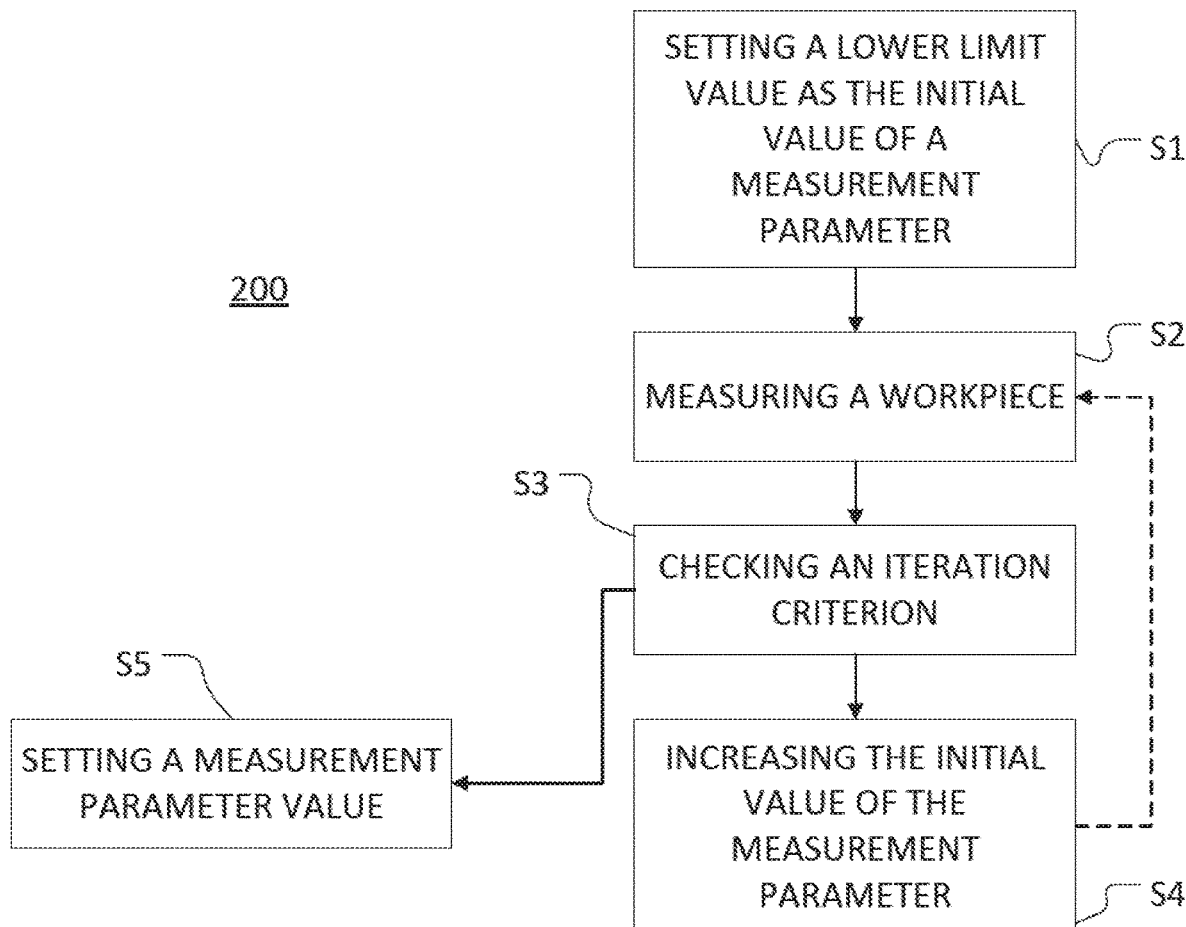
FIG. 2B shows a flow chart according to the first exemplary embodiment of the disclosure.

With reference to FIGS. 2A and 2B, a first exemplary embodiment of a method 200 is described which can be implemented with the arrangement 11 shown in FIG. 1. In FIG. 2A, possible measurement parameter changes are shown, whereas FIG. 2B contains a flow chart of the method 200. In the case of this exemplary embodiment, it is generally envisaged to increase a measurement parameter value by default from its lower limit value $a_{min}$ in the direction of its upper limit value $a_{max}$. The lower limit value $a_{min}$ is selected here as the initial value $a_0$. The increase takes place in this case with the same amounts (for example an increase by 10% in each case with respect to the previous value). The measuring speed, which, when increased from the lower limit value $a_{min}$, makes a higher throughput possible, but also causes an increasing risk of measuring inaccuracies, is considered as the measurement parameter.

It should be emphasized that, in all exemplary embodiments (but also in the disclosure in general), the iterative changing of the measurement parameter values does not have to take place with the same amount in each case. Instead, irregular intervals may also be provided between successive values (for example continuously increasing or decreasing intervals considered over the values in their entirety). A measurement parameter value to be applied may consequently also be flexibly calculated and not only changed according to always the same criterion. For example, the measurement parameter value may be interpolated from the previous values and/or be determined in accordance with a stored functional relationship.

With reference to the flow chart shown FIG. 2B, in step S1 (or in the course of measure S1) first the initial value $a_0$ of the measurement parameter is selected and, as already mentioned, set as the lower limit value $a_{min}$. This is followed in step S2 by measuring a workpiece based on the initial value $a_0$ of the measurement parameter or in accordance with the initial value $a_0$ of the measurement parameter.

It should be emphasized that first a workpiece of which the properties are known and which in particular satisfies predetermined accuracy criteria is measured. It is accordingly a workpiece that has test characteristics which undoubtedly satisfy the desired accuracy. In the case shown, the workpiece takes the form of a shaft, which has cross-sectional regions with different diameters. Each of these diameters lies within a predetermined tolerance, and consequently has a desired accuracy.

In step S2, the corresponding cross-sectional regions are selected as a test element of the workpiece and are measured. On the basis of the measurement results, a shape deviation of these regions from an ideal circle is subsequently determined in step S3 as the test characteristic. A shape deviation of no more than 2.5 µm is prescribed as the admissible tolerance.

As described, the workpiece itself is within this tolerance. However, if the measuring speed is too high, the shape deviation may under some circumstances no longer be correctly recorded. Instead, shape deviations outside the tolerance would then be determined, but would then be attributable to an unsuitable choice of the measuring speed and not to the workpiece itself. The method therefore generally envisages determining suitable values of the measuring speed which make a particularly high throughput possible, but continue to allow a sufficient measuring accuracy.

In step S3, it is consequently also checked whether the current measurement parameter value can achieve a measurement result with which the test characteristic of the shape deviation has the desired admissible value of no more than 2.5 µm. The criterion according to which the shape deviation is to be no more than 2.5 µm forms an iteration criterion. Generally, the iteration criterion consequently concerns a check as to whether admissible values (no more than 2.5 µm) for a predetermined test characteristic (shape deviation) are achievable with a measurement parameter value.

If this is the case, in step S4, a renewed iteration cycle is initiated. Therefore, the value of the measurement parameter is changed, and in the example described is increased. On the basis of the initial value $a_0$ in this case first an increase takes place to the value $a_{n-1}$ (see FIG. 2A). Subsequently, steps S2 (measuring) and S3 (checking the iteration criterion) are performed once again on the basis of the measured parameter value changed in step S4 (see arrow depicted by dashed lines in FIG. 2B). In the example shown in FIG. 2A, admissible values of the test characteristic are also obtained for the measuring speed, with the value $a_{n-1}$ and also with the value $a_n$ selected in the subsequent cycle so that the iteration criterion is satisfied in each case.

Therefore, in the course of a renewed iteration, the measuring speed is increased one more time, to be precise to the value $a_{n+1}$ (see FIG. 2A). In this case, however, it is established in the course of step S3 that the test characteristic of this deviation has a value of more than 2.5 µm, and is therefore inadmissibly high. In other words, the measuring speed at the value $a_{n+1}$ is so high that a sufficient measuring accuracy can no longer be achieved, and incorrect measurement results are obtained with respect to the shape deviation. The iteration criterion checked in step S3 is therefore not satisfied.

According to a first aspect, it is therefore possible to continue directly with step S5, in which the value $a_n$, for which the iteration criterion was last satisfied, is set as the measurement parameter value with which future measurements of workpieces of the same type of construction are to be carried out. On account of its increased measuring speed with respect to the initial value $a_0$, this value makes a higher throughput possible, but at the same time also ensures sufficiently accurate measurement results.

According to a further aspect, however, it is envisaged to carry out a further iteration cycle, wherein in step S4 the value of the measuring speed is set at an intermediate value $a_{n+2}$, which lies between the two previous values an and $a_{n+1}$ (see FIG. 2A). To be more precise, this intermediate value $a_{n+2}$ lies between measuring speed $a_n$, at which the iteration criterion was last satisfied, and measuring speed $a_{n+1}$, at which the iteration criterion was not satisfied for the first time.

As can be seen in FIG. 2A, this results in a measuring speed $a_{n+2}$ that has been increased one more time with respect to the value $a_n$ with which potentially even faster measuring, and consequently a higher throughput, can be achieved. Whether a sufficient measuring accuracy can also be achieved with this measuring speed $a_{n+2}$ is determined when steps S2 and S3 are performed once again. If the iteration criterion is satisfied, the value $a_{n+2}$ is set in step S5 as the measurement parameter value for future measurement operations. If the iteration criterion is not satisfied, instead the value $a_n$ is set as the value for future measurement operations.

Even if it is not shown separately, further iterations may be provided on the basis of the value $a_{n+2}$, in order to further approach the measurement parameter value that makes the highest throughput possible, but still satisfies the iteration criterion. Therefore, the measurement parameter value may be alternately increased and reduced, depending on whether or not the iteration criterion is satisfied. In particular, whenever the iteration criterion is satisfied with the value $a_{n+2}$, the measurement parameter value could be increased again as often as it takes until the iteration criterion is no longer satisfied for the first time. Subsequently, the measurement parameter value could again be reduced as often as it takes until the iteration criterion is satisfied again, and so on. This may be carried out as often as it takes until the highest number of iterations is reached. In this case, that measurement parameter value with which the iteration criterion was last satisfied and/or generally the highest measurement parameter value with which the iteration criterion was satisfied would then be selected.

Figure 3A:
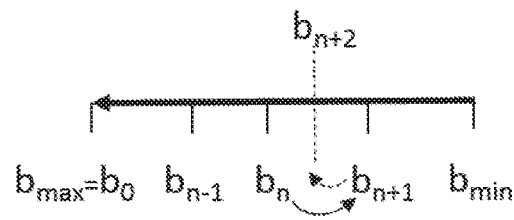
FIG. 3A shows representations of possible measurement parameter changes according to a second exemplary embodiment of the disclosure.

A method 300 according to a further exemplary embodiment is described below with reference to FIGS. 3A and 3B.

Figure 3B:
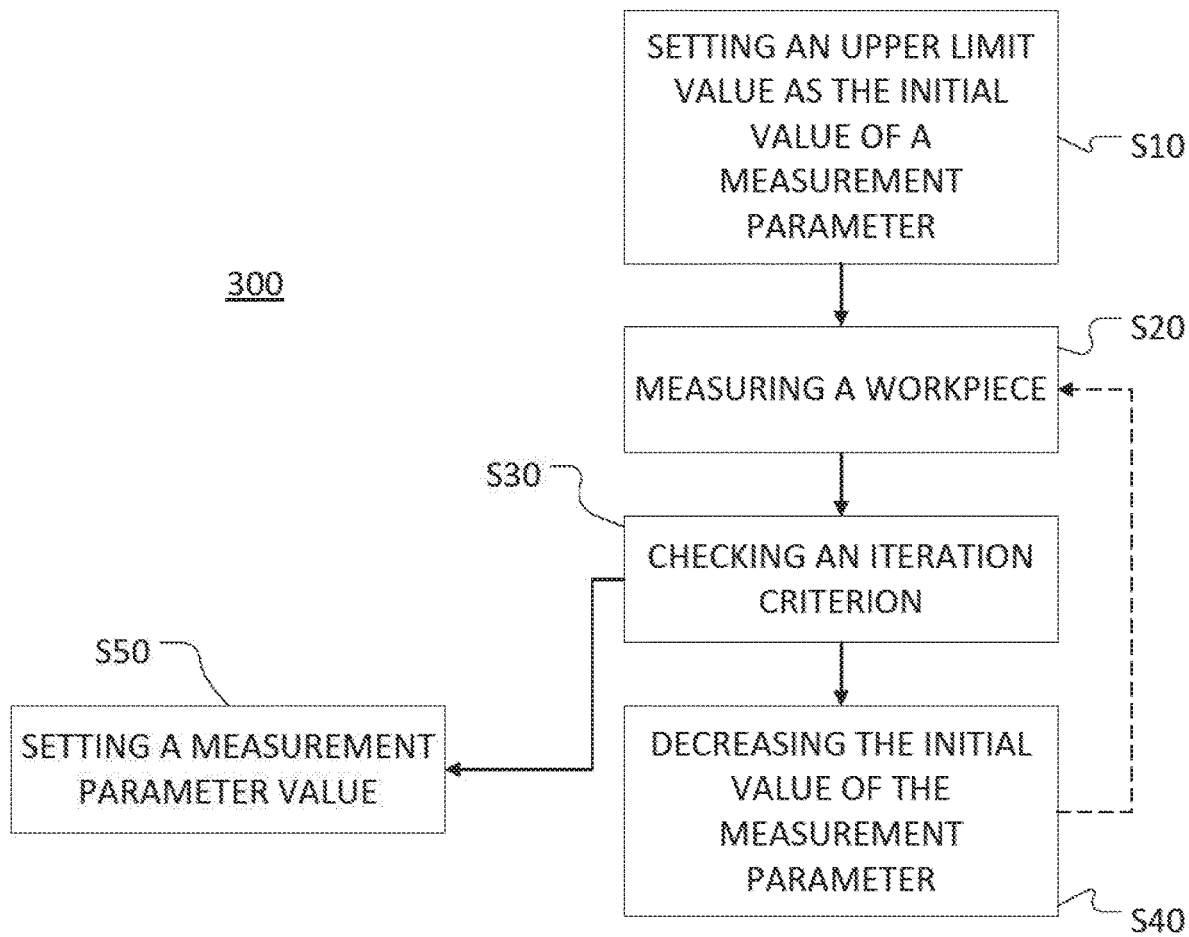
FIG. 3B shows a flow chart according to the second exemplary embodiment of the disclosure.

FIG. 3A in this case again shows possible measurement parameter changes, whereas FIG. 3B shows a flow chart. This exemplary embodiment differs from the previous exemplary embodiment with regard to the changes carried out, of the measurement parameter and of the iteration criterion considered. Unless otherwise stated or evident, with respect to the further details it otherwise coincides with the method shown in FIGS. 2A and 2B.

In the first step S10, first the initial value of the measurement parameter $b_0$ is set. As a difference from the first exemplary embodiment, here, however, an upper limit value $b_{max}$ is selected as the initial value $b_0$. This is used in step S20 to measure a workpiece with once again previously known properties and a preferred accuracy and to check the measurement result in step S30 with regard to the satisfying of an iteration criterion. The iteration criterion in this case concerns the reaching of inadmissible values of a test characteristic. The test characteristic is in this case once again defined as a shape deviation, which has inadmissible values if a shape deviation of more than 2.5 µm is established. In this exemplary embodiment, the iteration criterion is therefore always satisfied whenever there are inadmissible values with a corresponding shape deviation of more than 2.5 µm. In other words, the measurement parameter is to be changed as long as it takes and at least as many iterations are to be carried out as it takes before a test characteristic with admissible values is obtained.

Once again, the measuring speed is considered as the measurement parameter. If it lies close to its upper limit value $b_{max}$, a high workpiece throughput through the CMM is made possible. However, as expected, in this case inaccuracies that are too high occur, not allowing admissible values with regard to the selected test characteristic to be recorded. Therefore, it should be ensured by the iteration criterion that the measuring speed is reduced by default and successively until admissible values of the test characteristic can be recorded.

For the example shown, it is determined in step S30 with the initial value $b_0$ that the iteration criterion is satisfied because a shape deviation of more than 2.5 µm, and consequently an inadmissible value, is obtained. Since the iteration criterion is consequently satisfied, step S40 is then performed. In this step, the measurement parameter value $b_0$ is changed, i.e., the measurement parameter value is decreased with respect to the initial value $b_0$ to a value $b_{n-1}$ (see FIG. 3A). Subsequently, the method returns to step S20, in order to measure the workpiece in accordance with this new measurement parameter value $b_{n-1}$ (see the arrow depicted by dashed lines in FIG. 3B). Then, a new sequence of steps S20, S30 and S40 is performed. For the then-following value $b_n$, the iteration criterion is likewise satisfied. In step S40, the value is therefore reduced further, to the value $b_{n+1}$. For this value, it is however established in step S30 that the iteration criterion is not satisfied, since an admissible value of the shape deviation of less than 2.5 µm has been obtained. In principle, the method could immediately end in step S50 and the value $b_{n+1}$ could be set as the measurement parameter value for future measuring operations. With this value, which is the first value with which the iteration criterion has not been satisfied, a high throughput but also a sufficient measuring accuracy can be achieved.

However, in order to make an even higher throughput possible, step S40 may alternatively be performed once again to increase the value $b_{n+1}$, at which the iteration criterion was not satisfied for the first time. The increase takes place in this case by obtaining an intermediate value $b_{n+2}$, which lies between the value $b_n$, for which the iteration criterion was last satisfied, and the value $b_{n+1}$, for which the iteration criterion was not satisfied for the first time.

If it is established that the value $b_{n+2}$ likewise does not satisfy the iteration criterion, since admissible values for the test characteristic are also obtained for it, this value $b_{n+2}$ can be set as the measurement parameter value for future workpiece measurements. If, however, the iteration criterion is satisfied with the value $b_{n+2}$ (i.e., inadmissible values of the test characteristic are once again obtained), it can be reduced one more time, but typically in such a way that a then-following and not separately shown value $b_{n+3}$ lies between the values $b_{n+2}$ and $b_{n+1}$. This can be repeated as often as desired, in order to approach that measurement parameter value with which the highest throughput is achievable along with a still sufficient accuracy. Alternatively, the method may end when a prescribed highest number of iterations or workpiece parameter changes has been reached in step S40.

Figure 4A:
FIG. 4A shows representations of possible measurement parameter changes according to a third exemplary embodiment of the disclosure.

A further exemplary embodiment is described below with reference to FIGS. 4A to 4C. FIG. 4A and FIG. 4C in turn represent diagrams showing possible changes of values of the measurement parameter, while in FIG. 4B, a flow chart of method 400 is shown. The method 400 of this exemplary embodiment differs from previous exemplary embodiments mainly with regard to the setting of the initial value. Unless otherwise stated or evident, the method otherwise coincides with the previous examples.

Figure 4B:
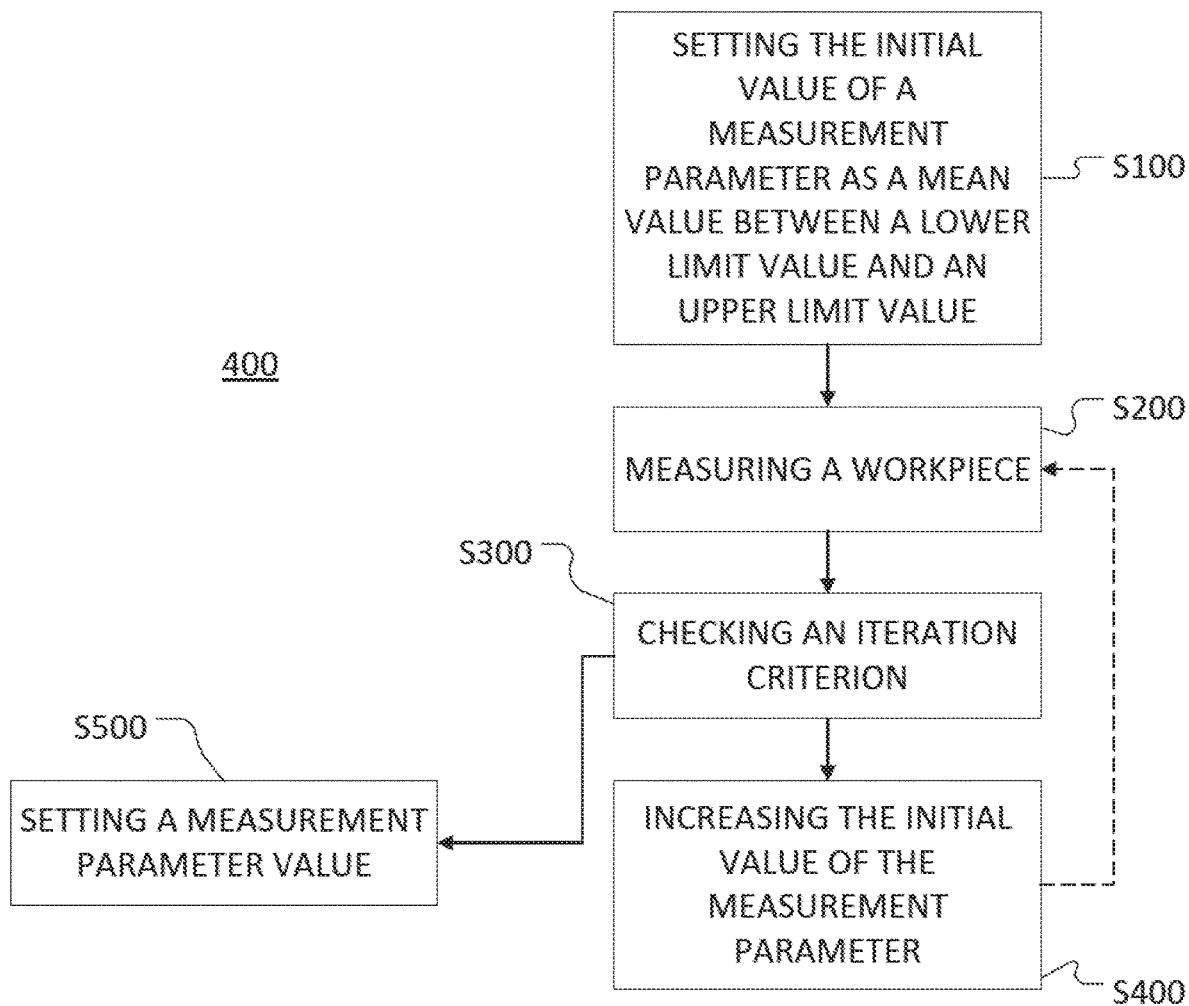
FIG. 4B shows a flow chart according to the third exemplary embodiment of the disclosure.
Figure 4C:
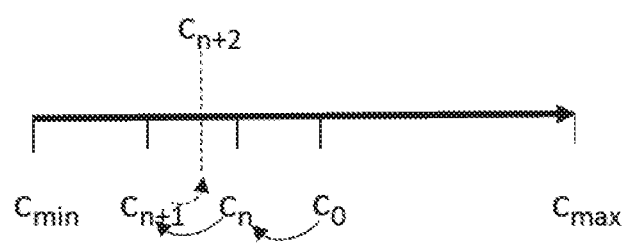
FIG. 4C shows further representations of possible measurement parameter changes according to the third exemplary embodiment of the disclosure.

First with reference to FIG. 4A, it can be seen in FIG. 4B that the initial value $c_0$ is not selected in step S100 as one of the limit values $c_{min}$ or $c_{max}$. Instead, it is set as a mean value between these limit values $c_{min}$, $c_{max}$, although other values between the limit values $c_{min}$, $c_{max}$ are also possible. In step S200, on the basis of this initial value $c_0$, a workpiece that once again has known properties, and in particular a typical accuracy, is measured for the first time. In step S300, it is then determined whether or not, with the value $c_0$, the test characteristic of a shape deviation has a desired admissible value.

In the exemplary embodiment shown in FIGS. 4A to 4C, the measurement parameter is once again the measuring speed. As shown in FIG. 4A, it is established in step S300 for the value $c_0$ that a sufficient accuracy can be achieved with this measuring speed.

When performing step S300 for the first time and reaching the desired measuring accuracy in the way described, it is therefore possible to change the measurement parameter in a way that increases the throughput and that the iteration criterion concerns the acquisition of admissible values of the test characteristic. To be more precise, it is specified that the iteration criterion concerns the acquisition of a shape deviation of no more than 2.5 µm.

In step S400, the value $c_0$ is then increased to $c_1$, which in principle would make possible a higher throughput along with a serial measurement of multiple workpieces. Subsequently, as shown by dashed lines in FIG. 4B, a renewed measurement S200 of the workpiece is carried out and the iteration criterion is once again checked in step S300.

Since this criterion is once again satisfied, in a further step S400 the measuring speed is increased to the value $c_{n+1}$. Then, however, it is established in step S300 that, with this measuring speed, a sufficient accuracy can no longer be achieved. By analogy with the previous example, the last admissible measuring speed could then be set in step S500 as the measuring speed for future workpiece measurements. Alternatively, it may be attempted to further approach the measuring speed with the highest throughput along with a still sufficient accuracy and for this purpose to decrease the value $c_{n+1}$ one more time to an intermediate value $c_{n+2}$ and to continue in a way analogous to the previous exemplary embodiments.

For the sake of completeness, it should be mentioned that in the previous exemplary embodiments, a value newly selected in step S400 can be selected in each case as a mean value between the values on either side of it, including the limit values. The value $c_n$ may for example be selected as a mean value between $c_0$ and $c_{max}$ ($c_n=[(c_0-c_{max})/2]4$). The same applies to the value $c_{n+1}$, which may be selected as a mean value between $c_n$ and $c_{max}$ ($c_n=[(c_n-c_{max})/2]4$).

Furthermore, in this case (but also in the case shown in FIG. 4C) it may be envisaged first to use the upper and/or lower limit value $c_{min}$, $c_{max}$ for a measuring process. Otherwise, a measuring procedure in which these limit values $c_{min}$, $c_{max}$ are not reached at all may occur. By initially checking the limit values $c_{min}$, $c_{max}$, it can also be ruled out that a sought optimum solution coincides with these values, and therefore under some circumstances a more exact iteration on the basis of the initial value $c_0$ is no longer required.

FIG. 4C shows the situation when it is established that a sufficient measuring accuracy cannot be achieved for the initial value $c_0$ (i.e., shape deviations of more than 2.5 µm have been recorded). When step S300 is performed for the first time, it is then specified that the measurement parameter is to be changed in a way that makes a higher measuring accuracy possible (i.e., the measuring speed is to be reduced). It is also specified that the iteration criterion concerns the obtainment of values of the test characteristic of the shape deviation that are not admissible (i.e., measurement parameter changes should take place at least as long as it takes until admissible values are obtained). In step S400, the speed is therefore reduced and measuring and checking according to steps S200 and S300 are performed once again.

As shown in FIG. 4C, the iteration criterion is also satisfied for the next measurement parameter value $c_n$, but not for the then-following value $c_{n+1}$. Since admissible shape deviations are obtained with the value $c_{n+1}$, this value could be set according to step S500 from FIG. 4B directly for being used in future workpiece measurements. By analogy with the explanation given above with respect to FIG. 3A, this value may however also be increased one more time to the intermediate value $c_{n+2}$, which lies between the values $c_n$ and $c_{n+1}$. In this way it can be attempted to further approach the measuring speed with the highest throughput along with a still sufficient accuracy.

Also in this case, the measurement parameter values may be selected in each case in such a way that they form a mean value between the values on either side of them, as described above with regard to FIG. 4A.

It goes without saying that the aforementioned exemplary embodiments can also be applied in a combined way to a single workpiece. If, for example, a workpiece has two regions or test elements to be measured, a parameter increase according to the first exemplary embodiment (see FIG. 2A and FIG. 2B) may be performed for the first region and a parameter reduction according to the second exemplary embodiment (see FIG. 3A and FIG. 3B) may be performed for the second region.

Similarly, the case may occur where there are different iteration stages for each region or test element to be measured of an individual workpiece. For example, a successive increase of the measurement parameter may also take place for a first workpiece region to be measured, for example between the values $a_{n-1}$ and $a_n$ in the first exemplary embodiment. For the second region, however, it may be that the iteration criterion has already no longer been satisfied, so that an intermediate value is selected there according to the value $a_{n+2}$ from FIG. 2A. Consequently, the measuring speed can be increased still further for one region, while the measuring speed is at least slightly reduced for a second region.

It also goes without saying that, for a given workpiece, a choice of values may be performed in the way described above not only for one individual measurement parameter. Instead, after the described setting of a suitable measuring speed value, other measurement parameters may also be considered, for example a probing force or an acceleration.

Furthermore, the inverse value of the speed may also be considered as a measurement parameter, which would then have to be reduced as much as possible to obtain admissible values.

The measurement parameter values that have been determined by any of the aforementioned examples, and in the end set for the future measuring of workpieces of the same type of construction, may furthermore be stored for later use. In particular, they may be stored locally in the data memory 15 of the CMM or generally in a so-called test plan.

In addition or alternatively, a log of the determination of parameters may be created, on the basis of which a user can obtain further information and/or create a database.

It is understood that the foregoing description is that of the exemplary embodiments of the invention and that various changes and modifications may be made thereto without departing from the spirit and scope of the invention as defined in the appended claims.

What is claimed is:

1. A method for increasing a throughput in a serial workpiece measurement by a coordinate measuring machine (CMM), the CMM being configured to measure a workpiece, the serial workpiece measurement being defined by at least one measurement parameter, and a value of the at least one measurement parameter being a variable value, the method comprising:
   (a) setting an initial value of the at least one measurement parameter, the initial value being a predetermined value of the at least one measurement parameter valid for measuring the workpiece;
   (b) measuring the workpiece with the initial value;
   (c) determining a value of at least one predetermined test characteristic based on a result of the measuring of the workpiece;
   (d) determining whether the at least one predetermined test characteristic satisfies a predetermined iteration criterion; and
   (e) changing the initial value of the at least one measurement parameter and repeating steps (b) to (d) upon determining that the at least one test characteristic satisfies the predetermined iteration criterion.

2. The method as claimed in claim 1, further comprising: increasing the initial value of the at least one measurement parameter in step (e) when the predetermined iteration criterion is satisfied.

3. The method as claimed in claim 2, wherein the predetermined iteration criterion is satisfied when an admissible value of the at least one test characteristic is determined.

4. The method as claimed in claim 1, further comprising: decreasing the initial value of the at least one measurement parameter in step (e) when the predetermined iteration criterion is satisfied.

5. The method as claimed in claim 4, wherein the predetermined iteration criterion is satisfied when an inadmissible value of the test characteristic is determined.

6. The method as claimed in claim 1, further comprising:
changing the initial value of the at least one measurement parameter at least once when in step (d) the predetermined iteration criterion is not satisfied; and
choosing a value of the at least one measurement parameter that lies between the initial value of the at least one measurement parameter not satisfying the predetermined iteration criterion and a value of the at least one measurement parameter which most recently satisfied the predetermined iteration criterion.

7. The method as claimed in claim 1, wherein the initial value lies between a predetermined lower limit value for the at least one measurement parameter and a predetermined upper limit value for the at least one measurement parameter.

8. The method as claimed in claim 7, further comprising:
determining at least one of (i) how the initial value of the at least one measurement parameter is changed based on a measuring accuracy achievable with the initial value, and (ii) determining how the predetermined iteration criterion is defined based on a measuring accuracy achievable with the initial value.

9. The method as claimed in claim 1, further comprising:
setting a measurement parameter value for subsequent workpiece measurements when at least one of the following preconditions is satisfied:
a prescribed highest number of changes of the initial value of the at least one measurement parameter has been reached;
an admissible limit value of the changed initial value of the at least one measurement parameter has been reached or exceeded;
a measurement parameter value is selected with which the predetermined iteration criterion is satisfied again after a prior failure to satisfy the predetermined iteration criterion; and
an admissible overall time period has been reached.

10. An arrangement for increasing a throughput in a workpiece measurement, the arrangement comprising:
a coordinate measuring machine (CMM) configured to measure a workpiece, the workpiece measurement being defined by at least one measurement parameter, and a value of the at least one measurement parameter being a variable value; and
a controller configured to:
(a) set an initial value of the at least one measurement parameter, the initial value being a predetermined value of the at least one measurement parameter valid for measuring the workpiece;
(b) measure the workpiece with the initial value;
(c) determine a value of at least one predetermined test characteristic based on a result of the measuring of the workpiece;
(d) determine whether the at least one predetermined test characteristic satisfies a predetermined iteration criterion, and
(e) change the initial value of the at least one measurement parameter and repeat (b) to (d) upon determining that the at least one test characteristic satisfies the predetermined iteration criterion.

* * * * *